Oct. 9, 1951 W. F. COATS 2,571,012
HOSE REEL
Filed April 8, 1949

William F. Coats
INVENTOR.

BY *[signature]*
ATTORNEY.

UNITED STATES PATENT OFFICE 2,571,012

HOSE REEL

William F. Coats, Tulsa, Okla., assignor of one-half to Henry S. McCoy, Tulsa, Okla.

Application April 8, 1949, Serial No. 86,288

1 Claim. (Cl. 299—78)

The invention relates to hose reels and has for its object to provide a device of this kind having a central perforated shaft extending axially into the reel, and the reel provided with a drum having a water receiving chamber provided with an outlet to which outlet the end of a hose may be connected.

A further object is to provide a cylindrical shield carried by the reel and having its end spaced thereby forming a longitudinal opening through which the discharge pipe extends.

A further object is to provide the ends of the water receiving cylindrical member with threaded extensions on which extensions are threaded caps cooperating with packing glands for forming a water-tight connection between the perforated pipe and rotatable water collecting drum, which drum rotates on the perforated pipe and with the reel.

A further object is to provide a double V-shaped handle, which handle may be grasped for moving the reel over the ground or may be utilized as ground engaging supports when the reel is turned up-side down.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
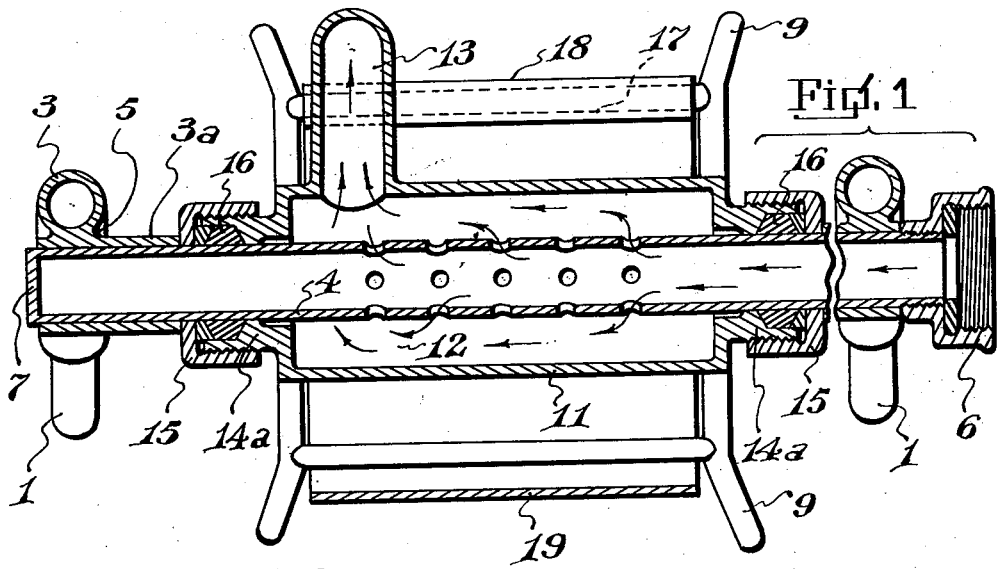
Figure 1 is a vertical longitudinal sectional view through the hose reel.
Figure 2:
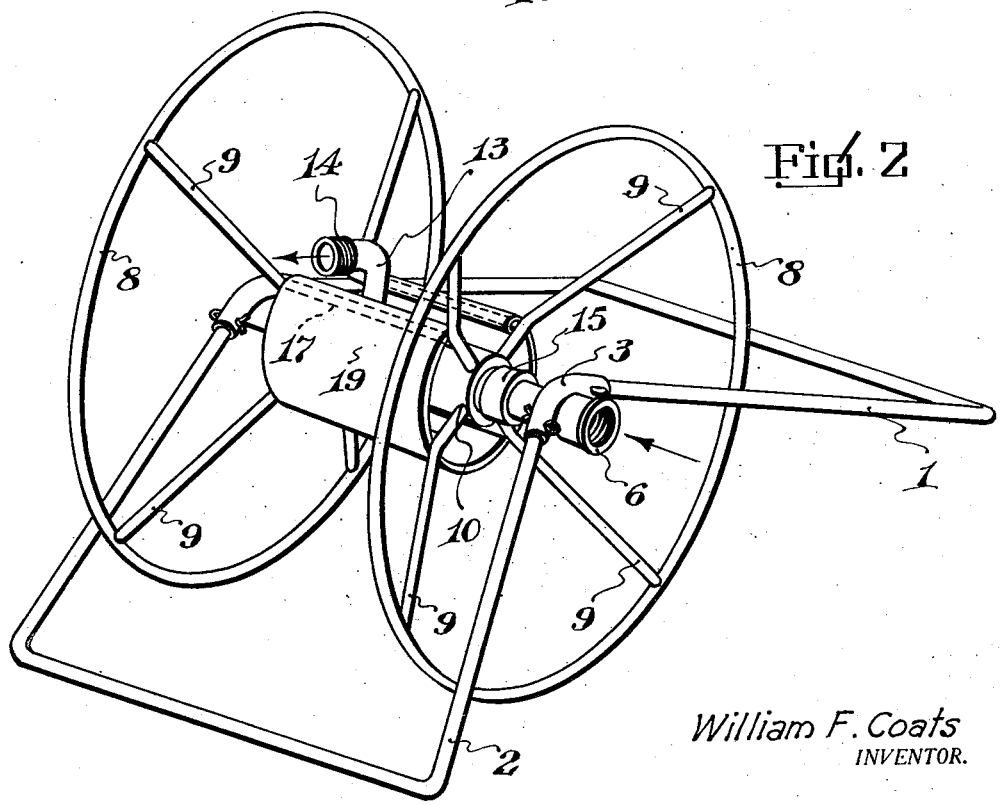
Figure 2 is a perspective view of the hose reel showing the reel inverted so that the handle members will support the rotatable parts spaced from the ground.

Referring to the drawing the numerals 1 and 2 designate two handle members, preferably U-shaped in form and at angles to each other, and which handle members are adapted to be used for rolling the device over the ground or, when the device is inverted, engage the ground and support the reel spaced from the ground. The handle members have their arms connected together, as at 3, and arched over a nipple 3a as shown, and welded at 5 to the periphery of the nipple. The perforated member 4, at its outer end, is provided with a hose coupling 6, to which may be coupled a short section of hose leading to a source of water supply. The other end of the perforated member 4 is closed as shown at 7.

The reel, which is rotatably mounted on the perforated member 4, comprises side wheels and hose guides 8, the arms 9 of which incline inwardly and are anchored at 10 to the periphery of the water collecting drum 11. The water enters the perforated member 4 and flows in the direction of the arrows, Figure 1, into the collecting chamber 12 and is then discharged through the radial discharge pipe 13 to a hose, which hose may be connected to the male hose coupling 14. The water collecting drum 11 is provided with reduced threaded flanges 14a, and threaded on said flanges 14a are caps 15, and these parts cooperate with the packing glands 16 for forming a water tight connection against the water pressure within the chamber 12, and at the same time allowing rotation of the reel on the perforated member 4.

Reel arms 9 are connected together by rods 17, and connected to one of said rods 17, by means of a roll 18, is a substantially cylindrical shield 19 of greater diameter than the drum 11, and the other end of said shield 19 is connected to another rod 17, thereby forming a transverse opening 20 between the shield ends and through which opening the discharge pipe 13 extends. The long hose which is connected to the coupling 14 is wound around the shield 19 for storage purposes and unwound the desired distance for use.

From the above it will be seen that a hose reel is provided which is simple in construction, and one wherein a hose may be easily transported to a point of use, the device inverted for spacing the reel from the ground, and at the same time the hose can be easily and quickly wound onto or from the reel with water pressure available at the hose nozzle, with any amount of hose left on the reel.

The invention having been set forth what is claimed as new and useful is:

A hose reel comprising a frame, a rotatable reel carried by said frame, a perforated water supply pipe extending through said frame, said reel being rotatably mounted on the perforated pipe, said reel comprising a water collecting drum surrounding the perforated pipe and of greater diameter than the pipe, thereby forming a water collecting chamber, said reel including annular wheels, the ends of said water collecting drum being provided with reduced threaded members rotatable on the perforated pipe, caps carried by the water supply pipe and threaded on said reduced threaded portions of the drum, packing members interposed between the caps and the reduced threaded members thereby preventing axial leakage from the drum chamber, a water discharge pipe carried by the drum and terminating in a hose coupling, radial outwardly inclined arms carried by the drum and having their outer end connected to the annular wheels, cross connecting bars connecting opposite pairs of radial arms of the wheels, a cylindrical shield surrounding the drum in spaced relation thereto, said shield having a transverse space between which the discharge pipe extends, the ends of said shield terminating in rolls extending around adjacent connecting bars between the radial arms of the wheels, thereby forming the transverse space.

WILLIAM F. COATS.

REFERENCES CITED

The following references are of record in the file of this patent:

UNITED STATES PATENTS

| Number | Name | Date |
| --- | --- | --- |
| 366,909 | Wirt | July 19, 1887 |
| 1,244,818 | Wirt | Oct. 30, 1917 |
| 1,339,785 | Perrine | May 11, 1920 |
| 1,537,637 | Jarvis | May 12, 1925 |
| 1,659,788 | Sifhovitz | Feb. 21, 1928 |
| 1,971,165 | Parker | Aug. 21, 1934 |